A
United States Patent [19]

Gleason

[11] 3,767,524

[45] *Oct. 23, 1973

[54] COMPOSITION FOR RECLAIMING PULP FROM WASTE PAPERS

[75] Inventor: C. Roy Gleason, Chicago, Ill.

[73] Assignee: World-Wide Paper Reclamation, Inc., Chicago, Ill.

[ * ] Notice: The portion of the term of this patent subsequent to Nov. 16, 1988, has been disclaimed.

[22] Filed: June 10, 1971

[21] Appl. No.: 151,916

Related U.S. Application Data

[62] Division of Ser. No. 33,988, May 1, 1970, Pat. No. 3,620,909.

[52] U.S. Cl. ................................................. 162/8
[51] Int. Cl. ............................................. D21b 1/08
[58] Field of Search ................. 162/8; 252/135, 156

[56] References Cited
UNITED STATES PATENTS 3,620,909   11/1971   Gleason ................................ 162/8
1,870,358   8/1932   Dils ........................................ 162/8

OTHER PUBLICATIONS

West, Deinking of Paper, Pub. by Institute of Paper Chemistry, Appleton, Wis., Apr. 1943

Primary Examiner—S. Leon Bashore
Assistant Examiner—Frederick Frei
Attorney—McDougall, Hersh & Scott

[57] ABSTRACT

The reclamation of purified and reusable pulps from various types of waste papers by first shredding the paper into fine pieces, boiling the shredded paper in a chemical solution containing sodium hydroxide, sodium carbonate, sodium or ammonium phosphate and sodium borate, water washing the chemicals from the cooked paper and then bleaching the pulp with a chemical bleach at elevated temperature.

6 Claims, No Drawings

COMPOSITION FOR RECLAIMING PULP FROM WASTE PAPERS

This is a division of my copending application Ser. No. 33,988, filed on May 1, 1970, and entitled "Method for Reclaiming Pulp from Waste Papers", now U.S. Pat. No. 3,620,909.

This invention relates to the reclamation of purified and reusable pulp from paper which may be in the form of clay coated paper, printed paper, or paper board, envelopes, magazines and trade papers and bond and ledger papers, printed, embossed or lined with various types of colored printing inks, magazine cover sheets, book paper, binders and the like.

Difficulty has been experienced in removing certain resinous or hot melt types of adhesives, color of papers, such as golden rods, canaries in bonds and ledgers, and various types of inks used in the printing, book publishing, magazine publication and the like, and some papers embodying large quantities of valuable fibers of even rag or cotton content. Rotogravure, offset, high gloss inks along with letter press inks of innumerable resin contents and colors that have to be removed, present additional problems. Many such paper wastes are being burned by thousands of tons a day and this despite inevitable paper shortages facing the industry, but they can be recovered by a fast method and at reasonable cost, and should be recovered.

It is most desirable to be able to reclaim the fibrous content of such waste papers for reuse in the making or upgrading of quality paper and paper board stocks for cartons and packaging. For such purposes, and as an object of this invention, it is desirable to provide a simple, economical and efficient process for the removal of sizings, or binder, or various resins and other color material present in the printing inks, coating resins, binder adhesives and the like, with a view towards yielding a clean white or colorless pulp which can be used to produce quality pulp in the manufacture and upgrading of news paper, printing paper, paper board, envelopes, bags and other paper or cellulosic products.

The invention will hereinafter be described with special reference to the reclamation of waste papers as derived from clay coated cover sheets and magazines, trade papers, etc. which have been printed with a wide variety of differently colored printing inks and sheets taken from the covers or bodies of magazines printed with various black and colored printing inks. Such printing inks are characterized by a high resinous content and pigments formed of carbon black, dyestuffs and the like. It will be understood that the hereinafter described process for reclamation of such printed magazine papers can be even more readily adapted to the reclamation of other types of papers printed or colored with various types of printing inks or unprinted or uncolored paper or paper board.

EXAMPLE 1

A definite weight of printed magazines, etc. to be recovered, from cover to cover with no pages removed or without removal of any of its inserts, is chopped or shredded while the waste paper is preferably dry. If certain large equipment is available, the magazines can be run in their entirety without cutting or without shredding.

The cut up paper is weighed, as to volume to be processed, and then introduced into tanks for boiling with water, preferably in the ratio of two gallons of water per one pound of paper, with four different chemicals added to the water. Boiling with agitation is carried out for at least 10 minutes per batch.

Cooking composition with water:
For 1 pound of chemicals
227 grams sodium hydroxide (caustic soda) dry weight
115 grams sodium carbonate (soda ash)
56 grams sodium or ammonium phosphate
56 grams sodium borate (Borax)

One pound of the chemical mixture is used per 10 pounds of paper. This corresponds to 200 pounds of chemicals per ton of paper with the chemicals dissolved in water in the described ratio of 2 gallons of the aqueous solution per pound of paper. The chemicals are believed to react synergistically in solution to form sodium borocarbonate as a reactive compound.

It is desirable to cook at boiling temperature for at least 10 minutes with vigorous agitation during the entire time but short of reduction of the material to a pasty pulp. Lower temperatures down to 180° F. can be used but this markedly increases the reaction time in the chemical solution so that, for practical purposes, it is desirable to make use of temperatures above 200° F. to the boiling point temperature of 212° F. for the solution. This produces a pulp that requires the addition of water to enable the mixture to be pumped or drained from the cooking vessel. The pulp is drained and then washed with cold water.

In the process of this invention use can be made of tanks or equipment formed of steel and, for batch operation, it is desirable to operate with batches of 2000 to 4000 pounds of paper.

The boiled paper is pulped with cold water in a conventional Hydropulper, Holland or Jordan, or a beater until it reaches a pulp stage and is again cold water washed and screened.

The washed pulp is drained and then taken up with hot water at a temperature within the range of 110°–140° F. and a conventional chlorine type bleach, such as sodium hypochlorite 5.25 active ingredient and 94.75 inert, is added in the amount up to 95 gallons per ton by weight of original cook. After bleaching for from two to five minutes, the pulp is again washed in cold water for removal of the chlorine bleach solution. Thereafter the pulp is ready to form into wet laps or briquetted for use in equipment for the manufacture of paper or paper board stock, etc. The wet laps can be shipped to near by paper mills without the necessity for drying or excessive rehydrolyzing thereby to save time while avoiding over-beating or deterioration of the pulp fibers or shortening of the pulp fibers. The briquettes can be quickly rebeaten for pulp formation.

Recovery of the fibrous component of the original waste papers varies in their yields as to the kind and classification of the waste used. The fiber that is recovered is entirely free of inks, clay coatings, adhesives, fillers and sizing of the type originally present in the waste paper stock and is thoroughly antiseptic and free of slimicides and fungicides. Also, germs and bacteria are killed in the chemical boiling and treatment so that the end product is relatively pure and safe for further reuse. The pulp fibers can be used alone or in combination with other pulps or with rag or cotton containing pulp for use in the manufacture of fine white papers or bonds or ledgers. Kraft paper can be reclaimed from bags, envelopes, printing papers, paper board, carton stock or the like in high yields. According to the class of paper recovered, the pulp can be used in controlled mixtures and percentages that can be standardized to meet uniform specifications. Recovery of bonds and ledgers and bleached Kraft are most desirous and give high yields of 80 percent and some 90 percent yield and offer greater demand and profit.

EXAMPLE 2

Cancelled and used bank checks and stock certificates, usually printed on yellow, green or blue safety paper in any proportion can be substituted for other high grade papers and processed, as in Example 1. The reclaimed pulp is pure white with better than 80 percent recovery.

EXAMPLE 3

25 percent–50 percent rag or cotton content paper in the form of bond paper with engraved letterheads was processed in accordance with Example 1. Pads formed by filtering the reclaimed fiber showed highest recovery yields of the rag and cellulose fiber without noticeable deterioration in the fiber. White bond waste carries a premium and thus limits the available supply, but using all colored or all mixed, greatly increases the tonnage available for reclamation in accordance with Example 1. These papers offer no problems when processed as in Example 1.

EXAMPLE 4

Large heavy envelopes of Kraft paper, with variously colored tags pasted on the surface and with cancelled postage stamps left on were processed in various amounts. Some were unbleached and left as natural Kraft and some were bleached to different stages on up to real white. The paper was treated as in Example 1, but with the original vigorous boiling cook lasting for 10 to 15 minutes and use was made of slightly longer bleaching.

A Kraft pulp was reclaimed having a slight yellowish tinge with a recovery yield of more than 80 percent of the fiber originally present in the envelopes. When processed a little longer in bleach, the yield was the same but the pulp was very white.

The process, as described in Examples 1–4, is subject to a number of variations.

In the chemical bath, in which the disintegrated paper is cooked, the sodium hydroxide can be substituted in whole or in part in Example 1 by other alkali metal hydroxides, such as potassium hydroxide. The sodium phosphate can be substituted by ammonium phosphate or other alkali metal phosphates such as potassium phosphate.

While it is preferred to make use of the chemical components of the solution in the ratio described in Example 1, variation of chemicals in the amount of ± 10 percent can be employed. The amount of chemical solids per pound of paper can vary within thp range of one part by weight of chemical solids per five to 20 parts by weight of paper, the best results being secured in the ratio employed in Example 1 of one part by weight chemical solids per 10 ± parts by weight of paper. The solution can be formulated to contain the described amounts of chemicals in solution in the ratio of 20 gallons solution per 0.5 to 2 pounds of chemicals and preferably in the ratio of 20 gallons solution per 0.8 to 1.2 pounds by weight of chemicals.

The paper can be boiled in the chemical solution at pressures above atmospheric pressure with corresponding higher temperatures but it is undesirable to make use of such higher temperatures as might cause deterioration of the fibers. It is preferred to process the paper at atmospheric pressure at a temperature of about boiling point temperature for the solution for about 10 to 15 minutes and for longer periods of time at lower temperature but it is not desirable to make use of a cooking temperature of less than about 180° F. and preferably not less than 200° F.

Similarly, the chlorine bleach can be carried out at temperatures up to 140° F. to below the 110° F. of Example 1 but it is undesirable to make use of a temperature for bleaching much below 100° F., otherwise the desired bleach will take an excessively long period of time, or in additional stages, with the danger of subjecting the pulp fibers to deterioration and increased costs.

It will be apparent from the foregoing that I have provided a new and efficient process for the reclamation of waste papers whereby a high quality pulp fiber is secured which may be used in the conventional manner for the production of paper and paper products.

It will be understood that changes may be made in the formulation and conditions of operation without departing from the spirit of the invention, especially as defined in the following claims.

I claim:

1. A composition for the recovery of pulp from waste papers the solids of which consists essentially of
   a. an alkali metal hydroxide
   b. an alkali metal carbonate
   c. an alkali metal or ammonium phosphate
   d. an alkali metal borate and present in the ratio of 227 ± 10 percent parts by weight of alkali metal hydroxide, 115 ± 10 percent parts by weight alkali metal carbonate, 56 ± 10 percent parts by weight of the phosphate and 56 ± 10 percent parts by weight of the borate.

2. A composition as claimed in claim 1 in which the chemicals are present in the ratio of
   227 parts by weight of the hydroxide
   115 parts by weight of the carbonate
   56 parts by weight of the phosphate
   56 parts by weight of the borate.

3. A composition as claimed in claim 1 in which the alkali metal hydroxide is sodium hydroxide and in which the phosphate is sodium or ammonium phosphate.

4. A composition as claimed in claim 1 in which the alkali metal carbonate is sodium carbonate and in which the alkali metal borate is sodium borate.

5. A composition as claimed in claim 1 in which the chemicals are present in solution in aqueous medium in the concentration of 0.5 to 2 pounds of the chemicals per 20 gallons of solution.

6. A composition as claimed in claim 1 in which the chemicals are present in solution in aqueous medium in the concentration of 0.8 to 1.2 pounds per 20 gallons of solution.

* * * * *